Figure 2:
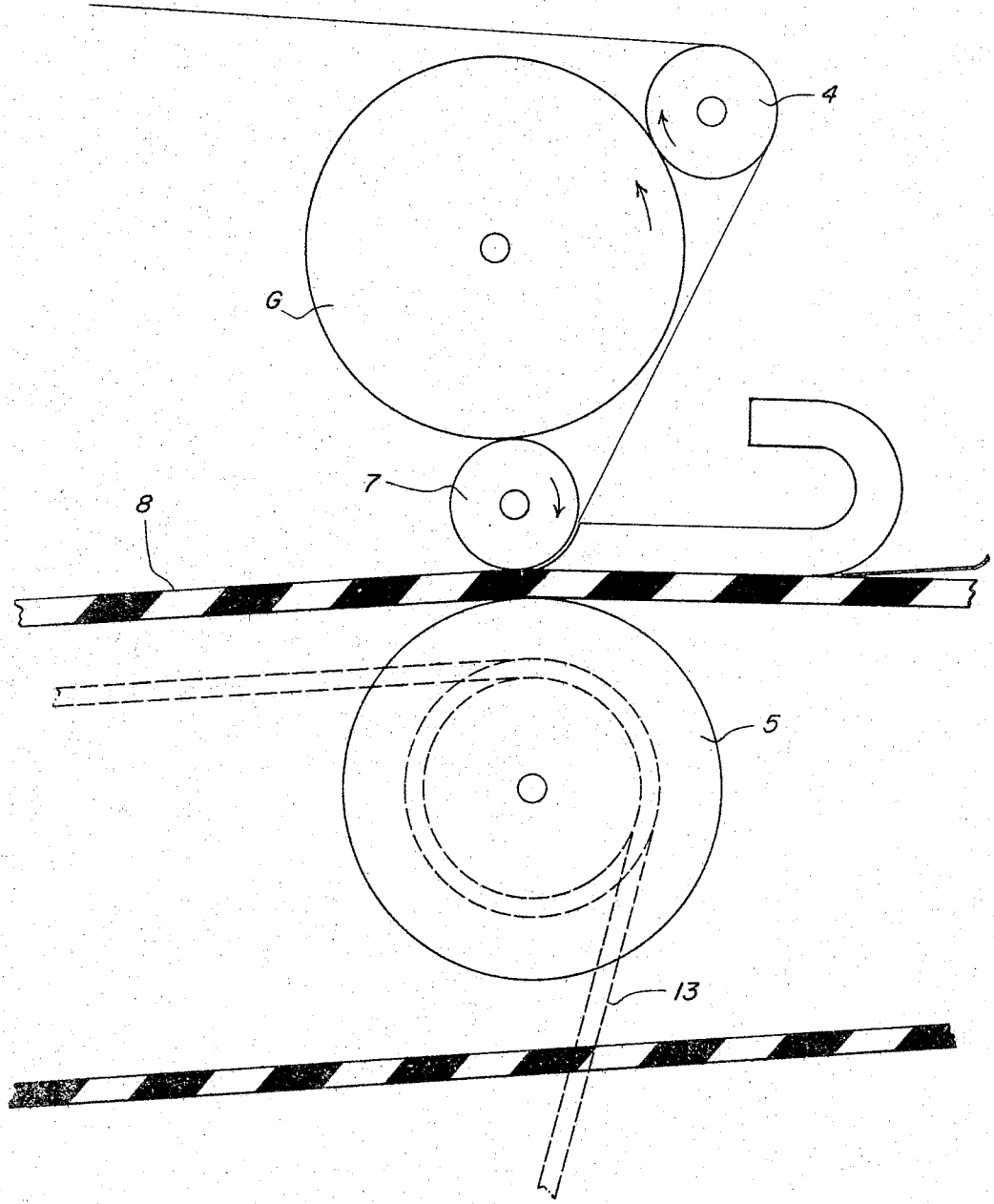

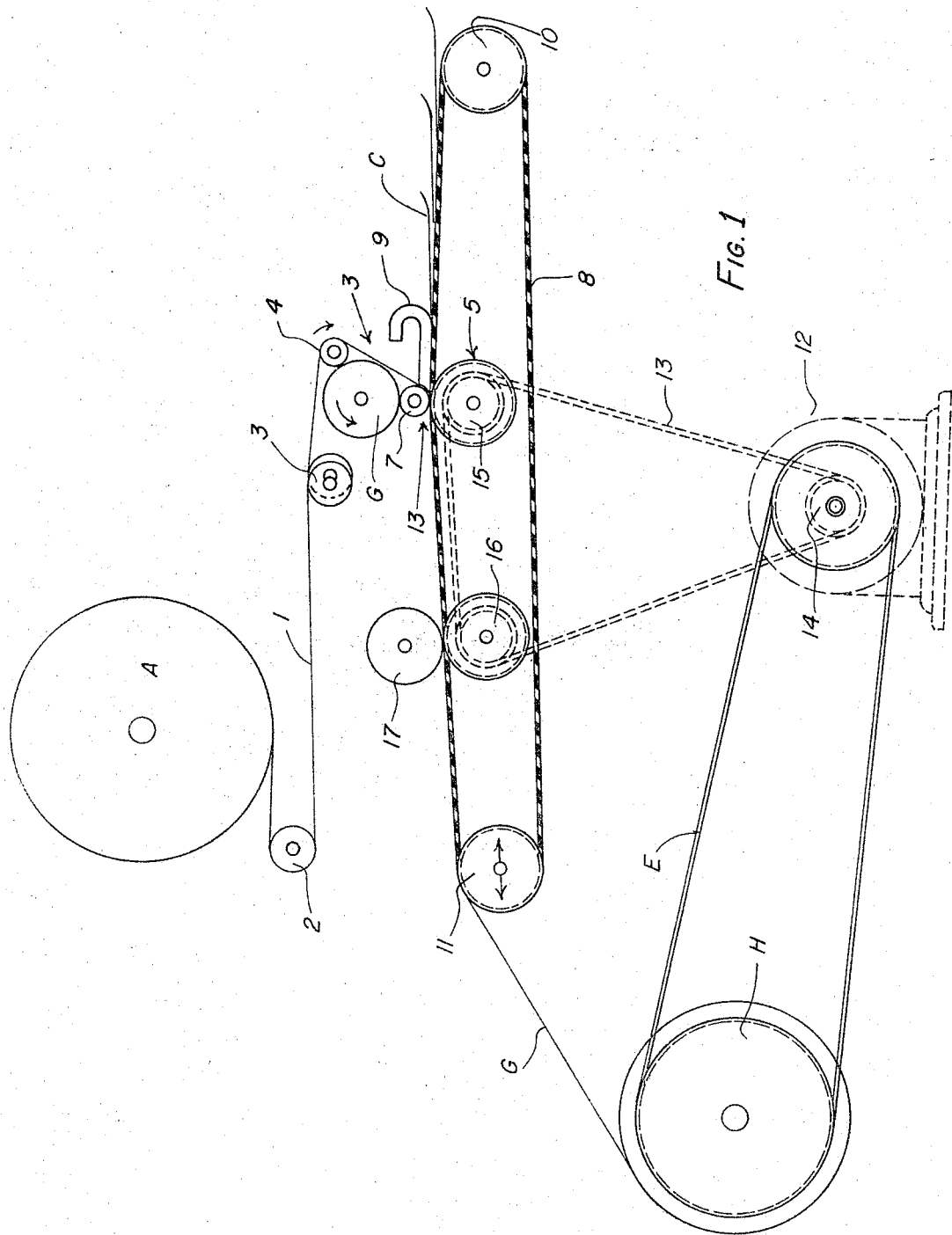
Fig. 1
INVENTOR.
ROBERT K. NEWCOMB

April 4, 1967 R. K. NEWCOMB 3,312,580
LAMINATING MACHINES
Filed Nov. 12, 1963 4 Sheets-Sheet 3
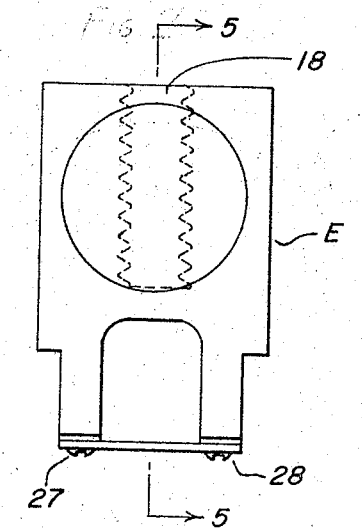
Fig. 3
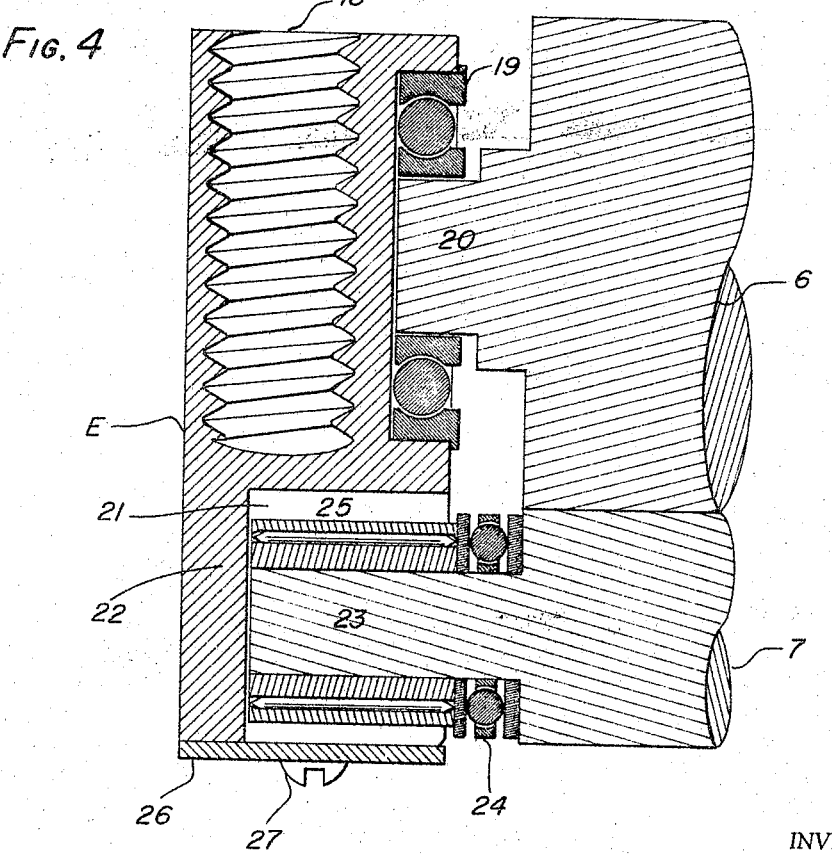
Fig. 4
INVENTOR.
ROBERT K. NEWCOMB
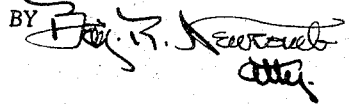

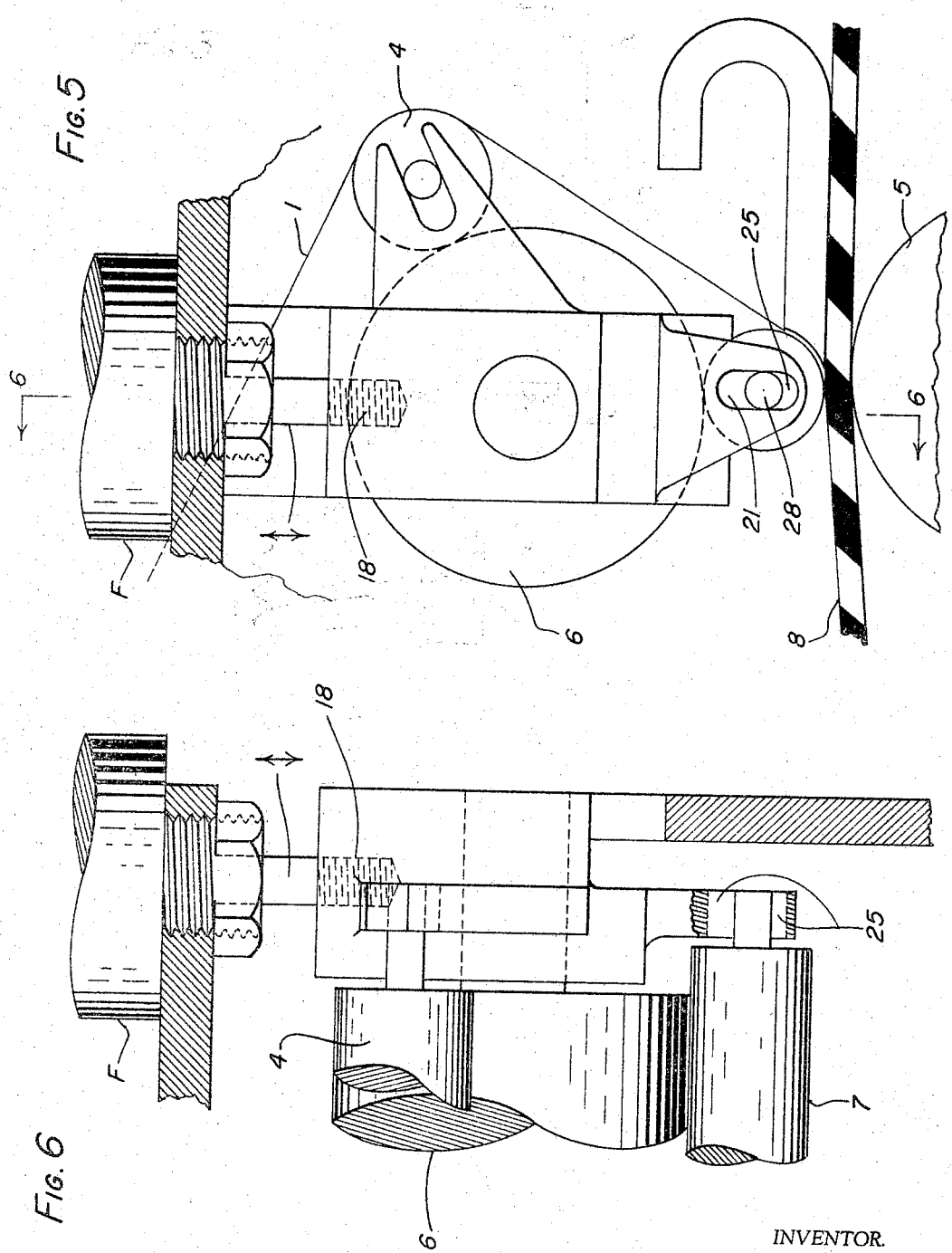

United States Patent Office 3,312,580
Patented Apr. 4, 1967

3,312,580
LAMINATING MACHINES
Robert K. Newcomb, Bound Brook, N.J., assignor to Rotobond, Inc., Northbrook, Ill., a corporation of Illinois
Filed Nov. 12, 1963, Ser. No. 322,648
5 Claims. (Cl. 156—550)

This invention is a laminating machine for uniting a strip of film such as acetate, or vinyl, or other material, over a surface of another sheet or web to serve as a protective shield; and is an improvement in the type of machine described and illustrated in my United States Patent 2,944,587 granted and issued to me July 12, 1960.

The machines of this type, and of my manufacture, are in general use in the United States and a great many foreign countries for protecting menus, price lists, catalogue sheets, book jackets and other printed matter where it is desired to preserve the printed matter against deterioration from exposure to moisture, grease, abrasive, scuffing, tearing, etc. while improving the appearance of the printed sheet or web to which the film is applied.

In the present improvement I have provided for a more nearly uniform interlayer of adhesive in a wet laminating machine regardless of the speed of the machine in lineal feet of lamination. In my earlier type of machine illustrated and described in my above identified issued patent there may occur an increase in the amount of adhesive applied as the rate of lamination increases. This is due to the fact that the hydraulic head developed at the nip where the adhesive is applied and spread between the sheets serves to slightly increase the opening between the pressure and fixed rolls constituting the laminating nip, the result being that more adhesive is allowed to pass through than may be required, and this limits the production rate of the machine.

Also, with the higher pressure at the nip there is greater difficulty in setting the side dams so as to minimize and control the marginal areas to which no adhesive is applied, whereas, with lower pressure of the hydraulic head at the nip there is a much lessened tendency to force the adhesive between the facing surfaces of the film and dams and hence the required dam and film clearance is much less critical for an even better result.

In a wet laminating machine I have found that in order to produce a uniform product, according to the above, it is essential to have in the lamination nip a small roll backed up by a pressure roll of larger diameter, the length to diameter ratio of the larger roll to the smaller nip roll being of the order of 15 to 1. In other words if the larger roll width is 15" long the smaller roll would be 1" diameter, the larger roll thus giving support against deflection of the smaller roll, the wedge effect at the nip being thus substantially reduced and thus also reducing the hydraulic head at the nip to the most desirable situation while still preventing deflection of the smaller roll. Other external supports of an equivalent order may be utilized within the scope of my invention such, for instance, as the so-called "swimming roll" effect.

Another advantage of the present invention is that with this small roll laminating nip the laminating pressure may be reduced to about 15 lbs., when a 2" diameter air cylinder is used as compared with double this pressure with a larger nip roll, say of the order of 2½" diameter. Also, the diameter of the underlying supporting member of the resilient type which may be either a roll or belt of the "neoprene" type may be of much lower durometer insuring a larger pressure area at the nip.

In the drawings forming a part of the disclosure of my invention, I have graphically illustrated a typical mechanical set-up of the invention accompanied by an illustration of one type of machine actually built by me and now operating in accordance with my invention:

In the drawings:
FIGURE 1 is a diagrammatic cross-section through a belt type laminator of the present invention.
FIGURE 2 is a similar illustration to FIGURE 1 but with an enlarged view of the laminating nip of FIGURE 1.
FIGURE 3 is a front elevation of the cross-head viewing it from the bearing side.
FIGURE 4 shows, in enlarged detail, the pressure and bearing set-up of the large roll and the supported small roll at the nip and is applicable to the belt type machine or the spring pressure type of machine as in my issued patent or the fluid pressure type of machine shown in FIGURES 5 and 6.

The machine, in one present embodiment of the invention, comprises an unwinding roll of plastic film A supported on the usual unwind stand common to the art and located above the general set-up of the machine; this is provided with any of the usual means of placing adjustable tension on the film as by a disc or band brake not shown. The web of film 1, as it unwinds is led back over an idler roll 2 thence forwardly for partial wrap over a bowed spread roll 3 of the well known Mt. Hope or other type, which is adjustable so that the bow of the roll may be changed in angle around the axis of the spreader roll journals to give more or less wrap for removing film wrinkles by transverse manipulation of the film thus spreading it smoothly before entering the laminating nip.

In the construction of the present machine the laminating nip assembly is designated by B and comprises the idler roll 4 over which the film web 1 travels before entering the nip; the nip drive roll 5, the upper roll 6, which is the pressure roll, the smaller nip roll 7 against which the pressure roll 6 contacts and the flexible and resilient moving carrier belt 8 traversing the nip width between the nip drive roll 5 and the nip roll 7. Side dams 9 approximate the surface of the film passing downwardly around the nip roll 7 in surface conformation and also at their base ride lightly in contact with the printed or other sheet or web C to be laminated. There may be two or several of these dams 9 across the machine dependent upon the areas to be laminated, the longitudinal distance between the dams form reservoirs for the fluid adhesive which bonds the film and sheet together as will be described. The curved end surfaces of the dams 9 do not necessarily actually ride on the surface of the film but are close enough thereto to prevent leakage of the adhesive.

The endless carrier belt 8 is supported between the idler rolls 10 and 11 which turn freely; slack in the belt 8 may be controlled by adjustment of the idler roll 11 to or from idler roll 10 in any usual and well known manner as by the common commercial take-ups constituting a usual means of adjusting belt tension, chain slack, etc., and which are obtainable from the Link Belt Co., Boston Gear Works, Woods Manufacturing Co. and other sources too numerous to mention and so well known in machine design as to need no specific illustration or description in this specification.

Between these idlers 10 and 11 is the main laminating nip 13. Fluid adhesive trapped transversely between dams 9 is spread uniformly between the contiguous surfaces of the film and sheet as the two move together through the nip 13, this movement being accomplished by driving of the belt carrier 8 through the medium of a variable speed drive motor 12 driving a chain 13 passing over the motor sprocket 14 and nip roller sprockets 15 and 16. A second nip is formed by a roller 17 riding on the upper face of the carrier belt 8 and once the film and sheet have been combined in the first nip, the function of this second nip D is to further enhance the immediate tack between the film and sheet and insure the uniformity of the bond already established between the two, this second nip may or may not be used dependent upon conditions.

In my previous Patent 2,944,587 a large roll controlled the spreading of the adhesive whereas, in the present invention, a small roll 7 performs dual function of spreading and laminating as it has been found by me that a uniformly thin film of adhesive is better formed across the width of film and sheet, and with less nip pressure, if a small diameter roll is used for the pressure contact roll than is the case if a larger diameter roll is used; however because of the small diameter, and the pressure required as well as the hydraulic head due to the trapping of the adhesive, the small roll would deflect and hence it is necessary to reinforce it with a much larger roll. In the illustration I have indicated the relative diameters of these rolls and in the machines I have built I have used rolls as small in diameter as ¾" with a larger contacting roll of a diameter of the order of 2" to 3" with good results, but these dimensions of roll diameters are variable within a considerable range dependent on width of the machine.

Referring now to FIGURES 1, 2, 4, 5, and 6:

The cross heads E as shown in FIGURE 5 and which are similar to those of my prior patent and may be moved up and down in the frame are drilled and threaded as at 18 to receive similarly threaded ends of the piston rods of double acting fluid pressure cylinders diagrammatically shown at F mounted on the side frames. Air cylinders are preferable because of the resilient character of their action. In the current models of the machine a 2" piston in a double acting cylinder at about 30 lbs. pressure is adequate for a laminating width of 30" and a cylinder may be used at each side of the machine or a single cylinder and yoke may be used.

The crossheads E are counterbored as shown in FIG. 3 to receive the anti-friction bearings 19 of FIGURE 4 for the turned ends 20 of the roll 6 which forms the supporting surface for the two rolls 4 and 7 which are of the same diameter, namely 1" with a 15" wide pressure roll. The roll 4 is mounted to move with the rolls 6 and 7 as shown in FIGS. 5 and 6 and is so located with respect to roll 6 that the film does not drag on the surface of roll 6 but, nevertheless passes over the roll 4 as the surface thereof is moved by the roll 6 at the same surface rate of roll 7 of the laminating nip and thus the tension on the film acts to keep roll 4 in driving contact with the surface of roll 6 and, at the same time, avoids such abrasion as might be the result if the film passed over a non-driven idler or moved against the surface of roll 6 which is moving in the opposite direction to the movement of the film.

The crossheads E are recessed at their lower sides as shown at 21 to accommodate the diameter of a needle bearing and cage 22 fitted onto the turned shaft ends 23 of the small diameter roll body 7 also carrying thrust bearing 24. The recesses 21 while fitting the roller bearing cages 22 to confine roll 7 against movement in a horizontal plane nevertheless have vertical clearance as at 25 and the bottoms of recesses 21 are closed by plates 26 held in place by screws 27 and 28 which plates and screws hold the needle bearings 22 from dropping out of the recesses 21 when the combination of rolls is raised by the air cylinders, or they may be formed with closed ends as shown in FIGS. 5 and 6. Similarly, the small roll 4 is supported in an identical set of bearings to roll 7 and is likewise carried by the crossheads in the position shown and since the set up of bearings for roll 4 is the same as for roll 7, with clearance in the recess so roll 4 always rides against larger roll 6 and is driven by contact therewith it is unnecessary to describe this in detail as it is within the province of common machine design to so integrate these parts that the result is achieved.

Referring now to FIGURES 1 and 2 the operation is as follows:

The unwinding web of film 1 from the supply roll A is led back over the idler roll 2, thence forwardly over the spreader roll 3 the bow of which is adjusted to the proper angle to eliminate wrinkles as the film passes there across. The film 1 then is led over the small roll 4 and beneath the nip roll 7 above endless belt 8 and then on through the second nip which may be formed by the rolls 16 and 17, the pressure on roll 17 being adjustably maintained by air cylinders F in the same manner as roll 6 of the first nip but here no small roll is required as there is no additional adhesive, and this second nip may or may not be used dependent upon conditions, that is to say if the printed sheet or web, the adhesive layer, and the film are all compatible for immediate tack, then the action of the first nip is all that is required.

The film having been threaded through the machine, the spaced dams 9 are adjusted toward the film where the film contacts the small roll 7 but with enough clearance between roll 7 and the curved end of the dam so that with the adhesive in the machine acting as the lubricant while it is wet there is no tearing of the film as would be the case if the dam pushed the film against the roll 7. The dams also are set such that they have their bottom faces above the surface of the belt a distance approximately the thickness of the underlapped printed sheets C being fed into the machine or, in the case of a printed web a distance equal to the web thickness. With adhesive between the spaced dams 9 across the width of the machine; the liquid adhesive being such as a water emulsion of polyvinyl-acetate is fed in between the dams and forms a pool as is the case in my previous patent. The dams are held in place in the same manner as in my prior Patent 2,944,587. The endless belt takes the place of the throw away carrier web of the previous patent and this reduces the cost of operation as the underlapped sheets are carried into the machine directly on the endless belt. The finished laminated product G is wound up around a large winding drum H as shown and driven with a slip belt H or other suitable means so that the winding operation is under a slight tension.

As the machine is started the adhesive spreads out between the dams 9 and covers the entire face of the printed sheet or web and as the sheet and web are combined in the nip the adhesive layer thus formed is trapped between the sheet and film and forms the bond which unites the two into a laminated product, the slight percentage of water in the polyvinylacetate emulsion is lost into the printed sheet and thus a transparent film of adhesive is the result and once dried it is no longer soluble in water.

It is to be noted that while I have shown the axes of rolls 5, 6 and 7 not only parallel in FIG. 1 but also in the same vertical plane, I have also found it to be an advantage to have the axis of the small roll 7 in an upright plane slightly ahead of the plane of the axis of the upper roll 6 for the purpose of compensating for the tendency of the small roll to pass through the space between the larger rolls 5 and 6; this also contributes to the reinforcing effect of the larger rolls 5 and 6 against deflection of the smaller roll 7.

In the case of the second nip found between the roll 17, the belt G and the roll 16 it is desirable, when this nip is used, that the roll 17 be driven at a lineal rate of speed slightly in excess of the lineal rate of emergence of the laminated product from the first nip to avoid the possibility of an excess accumulating between the nips and ultimately resulting in a fold or wrinkle as the material passes through the second nip.

While I have, in the foregoing, described my invention in specific forms it is nevertheless susceptible of various modifications in design without departing from the scope of the appended claims defining the invention.

I claim:
1. In a laminating machine for combining sheets or webs in overlying relation with a film of plastic in the presence of a wet adhesive, a tension controlled film unwind, pressure rolls of a diameter providing a minimum deflection at the laminating pressure and between which the film and sheet or web passes for lamination, means applying wet adhesive between said film and sheet in advance of said pressure rolls, and a smaller nip roll of a diameter which provides a lower hydraulic head in the adhesive at the nip than is the case if the pair of larger rolls formed the laminating nip, said smaller diameter roll being confined against deflection by its location between the larger diameter rolls, means for advancing the materials through the nip, and means for pressing the nip rolls together at the required laminating pressure.

2. In a laminating machine for combining sheets and/or webs in overlying relation with a film of plastic in the presence of a wet adhesive, a film unwind, pressure rolls of a diameter providing minimum deflection at the laminating pressure and between which the film and sheet or web are passed for lamination, means applying wet adhesive between said film and sheet in advance of said pressure rolls a smaller nip roll between the aforesaid nip rolls and which support the latter against deflection at the required laminating pressures, the film and sheet or web to be laminated passing between the small roll and one of its supporting rolls of larger diameter, said smaller roll having its axis parallel to the axes of the larger rolls but slightly ahead thereof, means for bringing the rolls together under laminating pressure when the film and sheet are passed between the smaller roll and one of its larger supporting rolls, means for advancing the material through the nip.

3. In a laminating machine for combining sheets and/or webs in overlying relation with a film of plastic in the presence of a wet adhesive, a film unwind, pressure rolls of a diameter providing minimum deflection at the laminating pressure and between which the film and sheet or web are passed for lamination, means applying wet adhesive between said film and sheet in advance of said pressure rolls a smaller nip roll between the aforesaid nip rolls and which support the latter against deflection at the required laminating pressures, the film and sheet or web to be laminated passing between the small roll and one of its supporting rolls of larger diameter, said smaller roll having its axis parallel to the axes of the larger rolls but slightly ahead thereof, means for bringing the rolls together under laminating pressure when the film and sheet are passed between the smaller roll and one of its larger supporting rolls, means for advancing the materials through the nip and a tensioned sheet or web conveying belt passing through the nip under the smaller of the rolls to convey the sheets through the laminating nip.

4. In a laminating machine for combining sheets and/or webs in overlying relation with a film of plastic in the presence of a wet adhesive, a film unwind, pressure rolls of a diameter providing minimum deflection at the laminating pressure and between which the film and sheet or web are passed for lamination, a smaller nip roll between the aforesaid nip rolls and which support the latter against deflection at the required laminating pressures, the film and sheet or web to be laminated passing between the small roll and one of its supporting rolls of larger diameter, said smaller roll having its axis parallel to the axes of the larger rolls but slightly ahead thereof, means for bringing the rolls together under laminating pressure when the film and sheet are passed between the smaller roll and one of its larger supporting rolls, means for advancing the materials through the nip and a tensioned sheet or web conveying belt passing through the nip under the smaller of the rolls to convey the sheets through the laminating nip the ratio of diameter of the small roll being less than one fifteenth the length dimension of one of the supporting rolls.

5. In a laminating machine for combining sheets or webs in overlying relation with a film of plastic in the presence of a wet adhesive, a tension controlled film unwind, pressure rolls of a diameter providing a minimum deflection at the laminating pressure and between which the film and sheet or web passes for lamination, means applying wet adhesive between said film and sheet in advance of said pressure rolls, and a smaller nip roll of a diameter which provides a lower hydraulic head in the adhesive at the nip than is the case if the pair of larger rolls formed the laminating nip, said smaller diameter roll being confined against deflection by its location between the larger diameter rolls, means for advancing the materials through the nip, and means for pressing the nip rolls together at the required laminating pressure, said smaller nip roll having a diameter on the order of one inch or less.

References Cited by the Examiner

UNITED STATES PATENTS

| | | | |
|---|---|---|---|
| 2,181,173 | 11/1939 | Catulle | 100—160 |
| 2,279,112 | 4/1942 | Drake et al. | 100—160 |
| 2,851,869 | 9/1958 | Quoos et al. | 100—160 |
| 2,944,587 | 7/1960 | Newcomb | 156—550 |

EARL M. BERGERT, *Primary Examiner.*

R. I. SMITH, M. KATZ, *Assistant Examiners.*